United States Patent
Krantz et al.

(10) Patent No.: US 7,881,238 B2
(45) Date of Patent: Feb. 1, 2011

(54) EFFICIENT FORMATION OF AD HOC NETWORKS

(75) Inventors: Anton W. Krantz, Kirkland, WA (US); Abhishek Abhishek, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 505 days.

(21) Appl. No.: 11/172,154

(22) Filed: Jun. 30, 2005

(65) Prior Publication Data

US 2007/0002783 A1    Jan. 4, 2007

(51) Int. Cl.
    H04B 7/00    (2006.01)
(52) U.S. Cl. ............... 370/310; 370/338; 370/328; 370/230; 370/235
(58) Field of Classification Search .......... 370/310, 370/277, 313, 349, 236, 238, 328, 230, 235, 370/310.2; 455/410, 426.1, 41.2
    See application file for complete search history.

(56) References Cited

U.S. PATENT DOCUMENTS

| | | | |
|---|---|---|---|
| 5,412,654 A | 5/1995 | Perkins | |
| 6,834,045 B1 * | 12/2004 | Lappetelainen et al. | 370/329 |
| 6,839,331 B2 * | 1/2005 | Rudnick | 370/312 |
| 6,842,460 B1 * | 1/2005 | Olkkonen et al. | 370/465 |
| 7,016,948 B1 * | 3/2006 | Yildiz | 709/221 |
| 7,031,266 B1 * | 4/2006 | Patel et al. | 370/254 |
| 7,212,513 B2 * | 5/2007 | Gassho et al. | 370/338 |
| 2002/0073204 A1 | 6/2002 | Dutta et al. | |
| 2003/0037033 A1 * | 2/2003 | Nyman et al. | 707/1 |
| 2003/0039240 A1 * | 2/2003 | Sutanto | 370/352 |
| 2003/0185233 A1 * | 10/2003 | Ji et al. | 370/466 |
| 2003/0187973 A1 | 10/2003 | Wesley et al. | |
| 2003/0187974 A1 | 10/2003 | Wesley et al. | |
| 2003/0188019 A1 | 10/2003 | Wesley et al. | |
| 2003/0217140 A1 | 11/2003 | Burbeck et al. | |
| 2004/0017794 A1 * | 1/2004 | Trachewsky | 370/338 |
| 2004/0103278 A1 | 5/2004 | Abhishek et al. | |

(Continued)

OTHER PUBLICATIONS

Microsoft Corporation, "Microsoft Windows Embedded operating system platforms, downloads, updates, news, and more. : Solution Overview", *MSDN Library* (2004), printed at http://msdn.microsoft.com/embedded/getstart/devplat/gateways/solution/default.aspx on Jun. 30, 3005.

(Continued)

*Primary Examiner*—Huy Phan
(74) *Attorney, Agent, or Firm*—Wolf, Greenfield & Sacks, P.C.

(57) ABSTRACT

An ad hoc network identifier may be received, for example, at an ad hoc network convergence module. One or more ad hoc network parameters may be generated as a function of the ad hoc network identifier. Each of a group of computers attempting to form an ad hoc network identified by the ad hoc network identifier may generate the one or more ad hoc network parameters. Two or more of the group of computers may perform an ad hoc network formation protocol parameterized with the generated one or more ad hoc network parameters. An instruction to join the network may be received, for example, at a networking service. If it is detected that the network is an ad hoc network, an ad hoc network address acquisition mode featuring accelerated ad hoc network address acquisition may be activated. Efficient formation of the ad hoc network may thus be facilitated.

18 Claims, 7 Drawing Sheets

U.S. PATENT DOCUMENTS

| | | | |
|---|---|---|---|
| 2004/0133689 A1* | 7/2004 | Vasisht | 709/228 |
| 2004/0162076 A1* | 8/2004 | Chowdry et al. | 455/445 |
| 2004/0170150 A1 | 9/2004 | Guo et al. | |
| 2004/0198392 A1* | 10/2004 | Harvey et al. | 455/456.1 |
| 2004/0218580 A1 | 11/2004 | Bahl et al. | |
| 2004/0246922 A1* | 12/2004 | Ruan et al. | 370/331 |
| 2004/0258007 A1* | 12/2004 | Nam et al. | 370/310 |
| 2004/0264428 A1* | 12/2004 | Choi et al. | 370/338 |
| 2005/0013253 A1* | 1/2005 | Lindskog et al. | 370/238 |
| 2005/0063328 A1 | 3/2005 | Dunagan et al. | |
| 2005/0091371 A1* | 4/2005 | Delegue et al. | 709/224 |
| 2005/0100040 A1 | 5/2005 | Guo et al. | |
| 2005/0122902 A1 | 6/2005 | Guo et al. | |
| 2005/0233789 A1* | 10/2005 | Maekawa | 463/1 |
| 2005/0260996 A1* | 11/2005 | Groenendaal | 455/445 |
| 2006/0039336 A1* | 2/2006 | Ishimura | 370/338 |
| 2006/0068799 A1* | 3/2006 | Morton et al. | 455/450 |
| 2006/0106918 A1* | 5/2006 | Evert et al. | 709/220 |
| 2006/0135066 A1* | 6/2006 | Banerjea | 455/41.2 |
| 2006/0174342 A1* | 8/2006 | Zaheer et al. | 726/23 |
| 2006/0193328 A1* | 8/2006 | Rao et al. | 370/395.32 |
| 2007/0110009 A1* | 5/2007 | Bachmann et al. | 370/338 |

OTHER PUBLICATIONS

Microsoft Corporation, "Plug and Play Networking with Microsoft Automatic Private IP Addressing (Internet Protocol Helper Technical Articles)", *MSDN Library* (Mar. 1998), printed at http://msdn.microsoft.com/library/default.asp?url=/library/en-us/dniph/html/pnpip.asp on Jun. 30, 3005.

Microsoft Corporation, "Windows Networking (WNet) [Windows Networking]", *MSDN Library* (last updated Mar. 2005), printed at http://msdn.microsoft.com/library/default.asp?url=/library/en-us/wnet/wnet/windows_networking_wnet_.asp on Jun. 30, 3005.

Zimmermann, Hubert, "OSI Reference Model—The ISO Model of Architecture for Open Systems Interconneciton," *IEEE Transactions on Communications*, vol. COM-28, No. 4, pp. 425-432 (Apr. 1980).

International Search Report from corresponding International Application No. PCT/US06/24452, filed Jun. 22, 2006.

\* cited by examiner ion of the invention.

EFFICIENT FORMATION OF AD HOC NETWORKS

FIELD OF THE INVENTION

This invention pertains generally to computer networking and, more particularly, to computer network formation.

BACKGROUND OF THE INVENTION

Networking of computers to facilitate communication with a myriad of data types has become common in the modern workplace and, increasingly, in our homes. From the now ubiquitous email, instant messaging, discussion groups, the sharing of electronic documents and files of every type, through streaming audio and video, to sophisticated immersive interactive environments, networked computers can enhance traditional forms of communication and enable new ways to work and play. The functionality boost provided to a computer by joining a network is significant, but there are a number of practical barriers to connectivity that may prevent or reduce access to full functionality. The problem can be particularly acute for mobile computers capable of joining wireless networks.

For the purposes of this description, wireless computer networks may be classified into two general types: infrastructure networks and ad hoc networks. Infrastructure networks include one or more dedicated network components such as a network hub or a wireless network access point. In contrast, ad hoc networks need not include such network components. For example, an ad hoc computer network may include little more than a group of computers each having compatible wireless network interface hardware.

As the name suggests, ad hoc networks are intended to provide for spontaneous or unplanned computer networking, for example, while traveling or visiting. As such, ad hoc networks can facilitate an ability to network anywhere and at anytime. However, formation of conventional ad hoc networks can be difficult and/or slow, so that, in spite of their potential, use of ad hoc networks remains relatively uncommon. Many ad hoc network formation difficulties stem from a lack of infrastructure facilities typically found in infrastructure networks.

One problem concerns ad hoc network convergence. Within a group of computers attempting to form an ad hoc network, none of the computers is necessarily the leader or network policy maker. Multiple different computers in the group may simultaneously attempt to initiate the formation of an ad hoc network. The computers in the group may be differently configured and react differently to network initiation and/or formation protocols. As a result, rather than converging to a single ad hoc network, multiple ad hoc networks may form among the group of computers.

Some conventional ad hoc network formation systems and methods lack effective mechanisms for convergence to a single ad hoc network. Even where such mechanisms are present, convergence may be so slow as to discourage regular use. Even a delay on the order of a minute may be sufficient to be considered a barrier to connectivity. Another source of delay in some conventional ad hoc network formation systems and methods is a lack of an effective mechanism for quickly assigning network identifiers such as network addresses to network participants. With respect to such mechanisms, perceived end-user delay can be as significant as low-level procedural delay.

BRIEF SUMMARY OF THE INVENTION

This section presents a simplified summary of some embodiments of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

In an embodiment of the invention, an ad hoc network identifier is received, for example, at an ad hoc network convergence module of an ad hoc network node. One or more ad hoc network parameters may be generated as a function of the ad hoc network identifier. Each of a group of computers attempting to form an ad hoc network identified by the ad hoc network identifier may generate the one or more ad hoc network parameters. Two or more of the group of computers may perform an ad hoc network formation protocol parameterized with the generated one or more ad hoc network parameters. Efficient formation of the ad hoc network may thus be facilitated.

In an embodiment of the invention, an instruction to join a network is received, for example, at a networking service. A type of the network to be joined may be discerned, in particular, it may be determined whether the network is an ad hoc network or, for example, an infrastructure network. If an ad hoc network is detected, an ad hoc network address acquisition mode featuring accelerated ad hoc network address acquisition may be activated.

BRIEF DESCRIPTION OF THE DRAWINGS

While the appended claims set forth the features of the invention with particularity, the invention and its advantages are best understood from the following detailed description taken in conjunction with the accompanying drawings, of which:

DETAILED DESCRIPTION OF THE INVENTION

Prior to proceeding with a description of the various embodiments of the invention, a description of a computer in which the various embodiments of the invention may be practiced is now provided. Although not required, the invention will be described in the general context of computer-executable instructions, such as program modules, being executed by a computer. Generally, programs include routines, objects, components, data structures and the like that perform particular tasks or implement particular abstract data types. The term "program" as used herein may connote a single program module or multiple program modules acting in concert. The terms "computer" and "computing device" as used herein include any device that electronically executes one or more programs, such as personal computers (PCs), hand-held devices, multi-processor systems, microprocessor-based programmable consumer electronics, network PCs, minicomputers, tablet PCs, laptop computers, consumer appliances having a microprocessor or microcontroller, routers, gateways, hubs and the like. The invention may also be employed in distributed computing environments, where tasks are performed by remote processing devices that are linked through a communications network. In a distributed computing environment, programs may be located in both local and remote memory storage devices.

Figure 1:
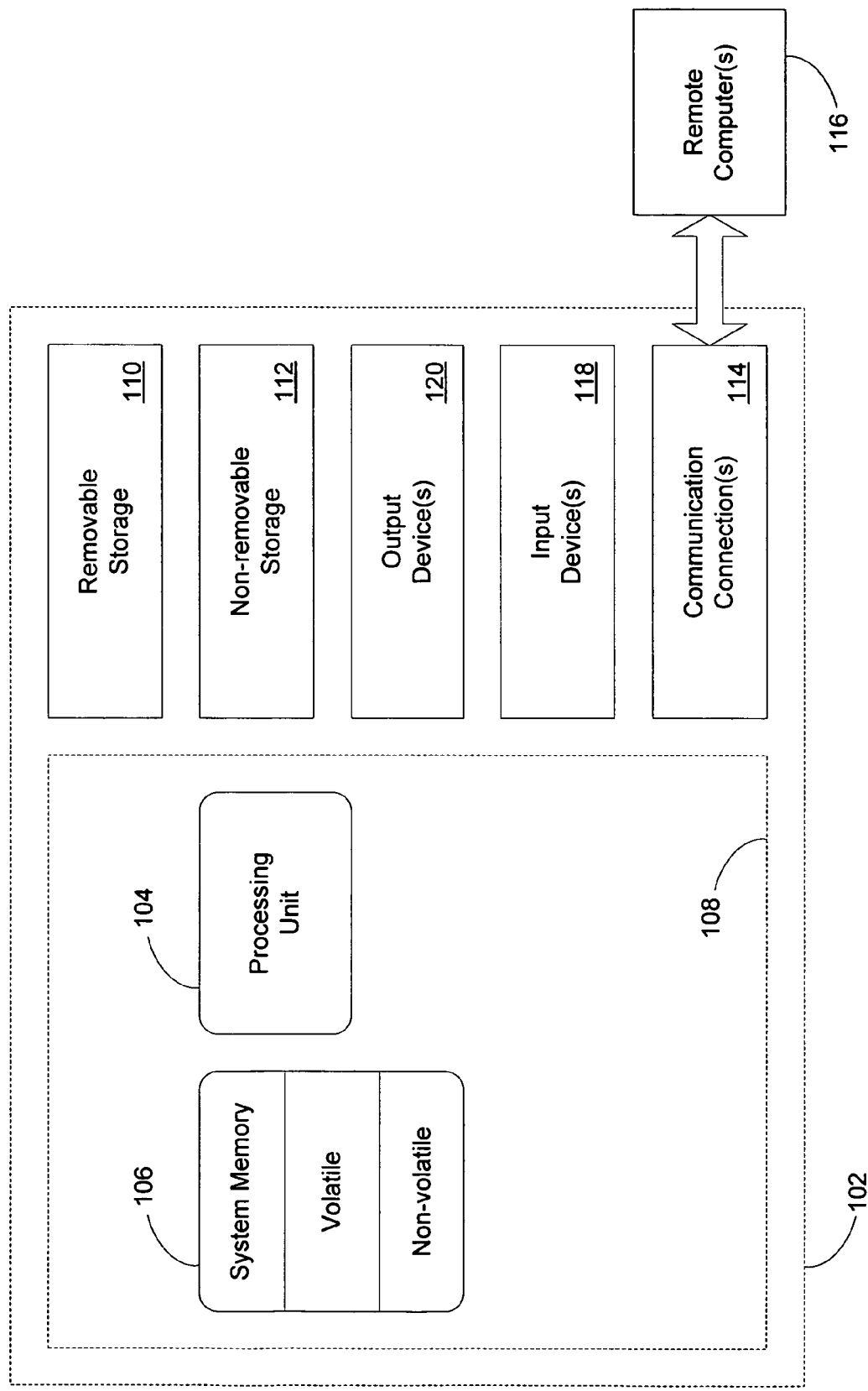
FIG. 1 is a schematic diagram generally illustrating an exemplary computer system usable to implement an embodiment of the invention.

Referring to FIG. 1, an example of a basic configuration for the computer 102 on which aspects of the invention described herein may be implemented is shown. In its most basic configuration, the computer 102 typically includes at least one processing unit 104 and memory 106. The processing unit 104 executes instructions to carry out tasks in accordance with various embodiments of the invention. In carrying out such tasks, the processing unit 104 may transmit electronic signals to other parts of the computer 102 and to devices outside of the computer 102 to cause some result. Depending on the exact configuration and type of the computer 102, the memory 106 may be volatile (such as RAM), non-volatile (such as ROM or flash memory) or some combination of the two. This most basic configuration is illustrated in FIG. 1 by dashed line 108.

The computer 102 may also have additional features/functionality. For example, computer 102 may also include additional storage (removable 110 and/or non-removable 112) including, but not limited to, magnetic or optical disks or tape. Computer storage media includes volatile and non-volatile, removable and non-removable media implemented in any method or technology for storage of information, including computer-executable instructions, data structures, program modules, or other data. Computer storage media includes, but is not limited to, RAM, ROM, EEPROM, flash memory, CD-ROM, digital versatile disk (DVD) or other optical storage, magnetic cassettes, magnetic tape, magnetic disk storage or other magnetic storage devices, or any other medium which can be used to stored the desired information and which can be accessed by the computer 102. Any such computer storage media may be part of computer 102.

The computer 102 preferably also contains communications connections 114 that allow the device to communicate with other devices such as remote computer(s) 116. A communication connection is an example of a communication medium. Communication media typically embody computer readable instructions, data structures, program modules or other data in a modulated data signal such as a carrier wave or other transport mechanism and includes any information delivery media. By way of example, and not limitation, the term "communication media" includes wireless media such as acoustic, RF, infrared and other wireless media. The term "computer-readable medium" as used herein includes both computer storage media and communication media.

The computer 102 may also have input devices 118 such as a keyboard/keypad, mouse, pen, voice input device, touch input device, etc. Output devices 120 such as a display, speakers, a printer, etc. may also be included. All these devices are well known in the art and need not be described at length here.

In the description that follows, the invention will be described with reference to acts and symbolic representations of operations that are performed by one or more computing devices, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

In an embodiment of the invention, systems and methods are provided for efficient ad hoc network formation. Common ad hoc network formation parameters may be established at each prospective network node to facilitate rapid ad hoc network convergence. Ad hoc network formation modes may be activated that, for example, provide for efficient assignment of ad hoc network identifiers with a need for elements and services typically found in infrastructure networks.

Figure 2:
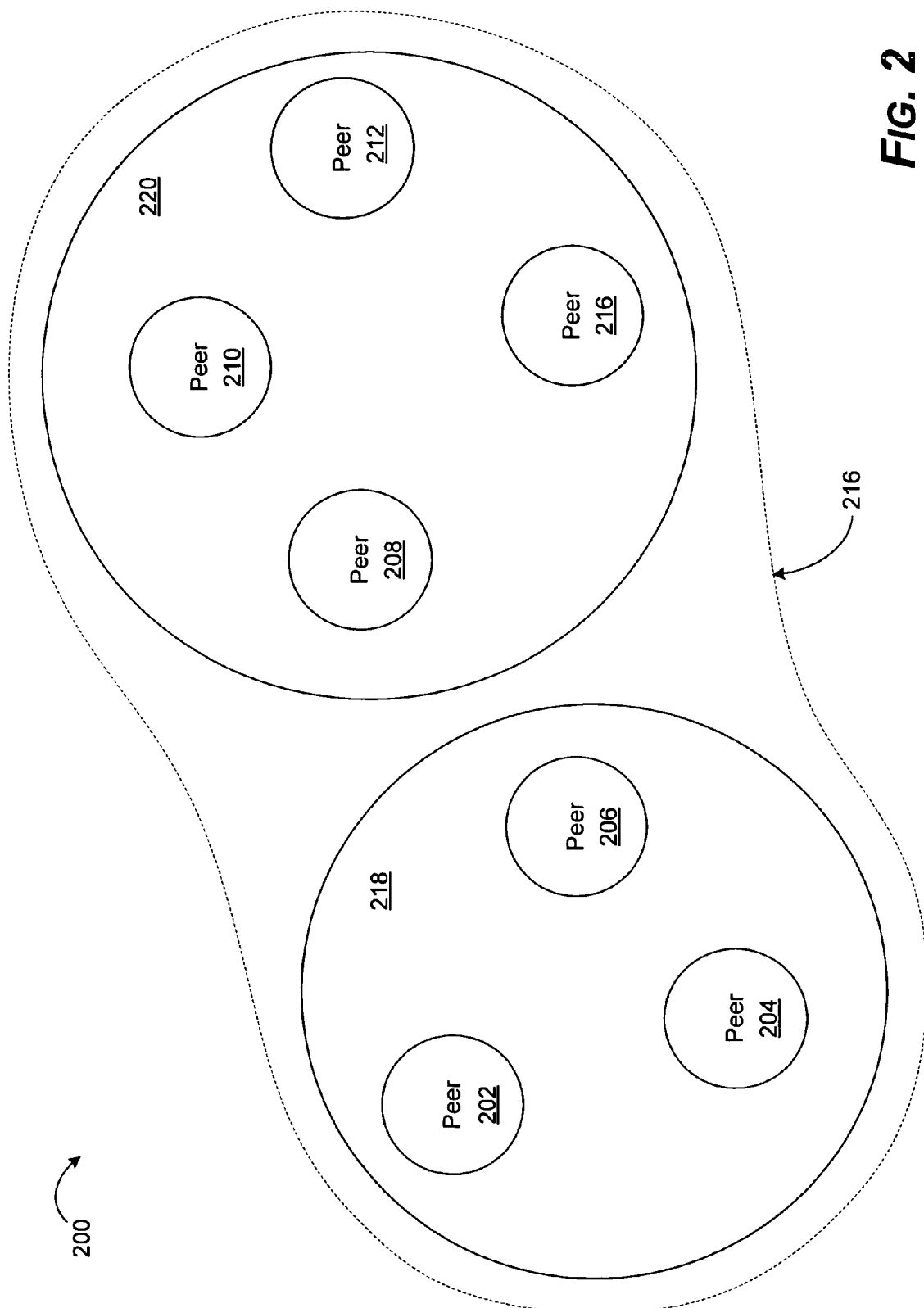
FIG. 2 is a schematic diagram illustrating an example computer networking environment suitable for incorporating aspects of the invention.

For clarity, it will be helpful to describe embodiments of the invention in a context of an example group of computers attempting to form an ad hoc network. FIG. 2 illustrates an example computer networking environment 200 suitable for incorporating aspects of the invention. The computer networking environment 200 includes computers 202, 204, 206, 208, 210, 212, 214 attempting to form a single ad hoc network indicated by dashed line 216.

At the time of the situation illustrated by FIG. 2, that is, some time after the initiation of the ad hoc network formation process, two ad hoc networks 218 and 220 have formed. One ad hoc network 218 includes computers 202, 204 and 206. The other ad hoc network 220 includes computers 208, 210, 212 and 214. Each of the computers 202, 204 and 206 may communicate with each other, and each of the computers 208, 210, 212 and 214 may communicate with each other. Communication between the ad hoc networks 218 and 220 may be limited or absent.

At some time before the situation illustrated by FIG. 2, more than the two ad hoc networks 218 and 220 may have formed among the computers 202, 204, 206, 208, 210, 212, 214. At some time after the situation illustrated by FIG. 2, the ad hoc networks 218 and 220 may merge to form the single ad hoc network 216, the ad hoc networks 218 and 220 may remain distinct, one or more computers 208, 210, 212 and 214 from one ad hoc network 220 may leave to join the other ad hoc network 218, one or more computers 202, 204 and 208 may leave the ad hoc network 218 to join the ad hoc network 220, or one or more of the computers 202, 204, 206, 208, 210, 212 and 214 may leave its current ad hoc network 218 or 220 to form a new ad hoc network (not shown in FIG. 2).

The formation of multiple ad hoc networks 218 and 220 as a step towards convergence on the single ad hoc network 216 is not necessarily undesirable. In an embodiment of the invention, what is undesirable is a long convergence time, that is, an excessive amount of time between initiation of ad hoc network formation and convergence on the single ad hoc network 216. Before describing example methods for ad hoc network formation and convergence in accordance with an embodiment of the invention, it will be helpful to describe an example architecture suitable for facilitating a computer-implementation of the methods.

Figure 3:
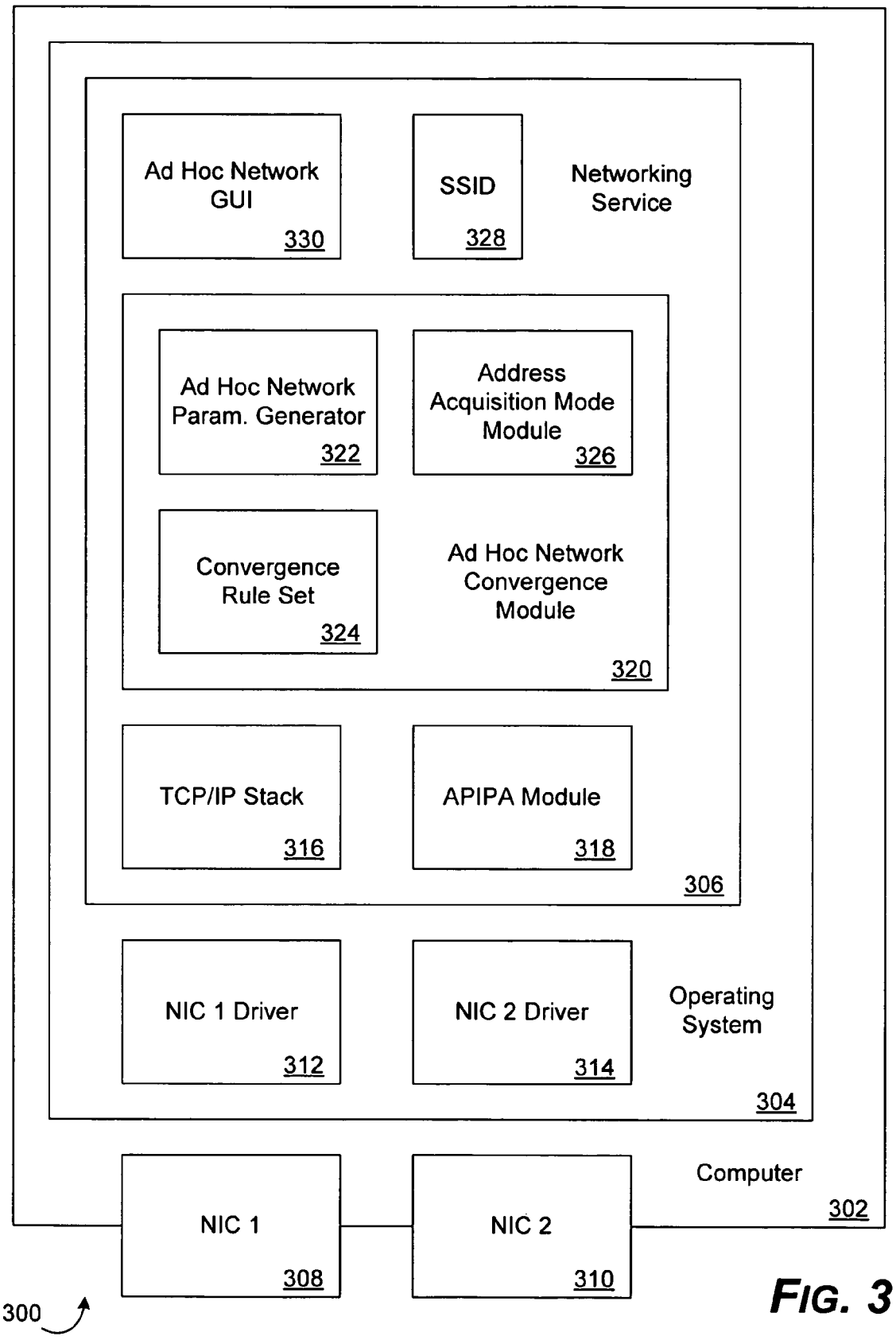
FIG. 3 is a block diagram depicting an example computer system architecture for efficient ad hoc network formation in accordance with an embodiment of the invention.

FIG. 3 depicts an example architecture 300 in accordance with an embodiment of the invention. For descriptive clarity, some elements of the architecture 300 may be specific to wireless networks in accordance with one or more of the Institute of Electrical and Electronics Engineers (IEEE) 802.11 family of wireless data communication standards such as 802.11a, 802.11b, 802.11g and/or 802.11n. However, each embodiment of the invention is not so limited. As will be appreciated by those of skill in the art, the designations IEEE 802.11a, 802.11b, 802.11g and the like are not merely identification codes for lengthy technical standards documents, but have become terms of art in and of themselves, so that even retail consumers may be aware of the terms, in particular because of the ways in which the standards do and do not interact with one another.

A computer 302 such as the computer 102 (FIG. 1) may include an operating system 304 such as a Microsoft® Windows® computer operating system. The operating system 304 may include a networking service 306 such as Windows® Networking as described in the *Windows® Networking (WNet)* section of the *Microsoft® Windows® Platform Software Development Kit (SDK) in the Microsoft Developer Network (MSDN®) Library* dated March, 2005. The networking service 306 may mediate access by the computer 302 to one or more networks such as the ad hoc networks 216, 218 and 220 (FIG. 2).

As will be appreciated by one of skill in the art, a networking architecture such as the architecture 300 may incorporate several distinct and at least partially independent layers of networking functionality. For example, the International Standards Organization (ISO) describes an open systems interconnect (OSI) model for networking architectures that distinguishes an application layer, a presentation layer, a session layer, a transport layer, a network layer, a data link layer and a physical layer. For details see Zimmerman, *OSI Reference Model—The ISO Model of Architecture for Open System Interconnection*, IEEE Transactions on Communications, April 1980. Details of a distinct, but not incompatible, layered networking architecture model in accordance with an embodiment of the invention are described by the *Gateways Solution Overview* article in the *Windows® Embedded Devices* section of the *Microsoft® Windows® Embedded Developer Center* in the *Microsoft Developer Network (MSDN®) Library* dated 2004.

The computer 302 may include one or more network interface cards (NICS) 308, 310 (only two are depicted in FIG. 3). For each network interface card 308, 310, the operating system 304 may include corresponding network interface card driver 312, 314 modules. The networking service 306 may send and receive data to and from the ad hoc networks 216, 218, 220 (FIG. 2) with the network interface card driver 312, 314 modules. The network interface card driver 312, 314 modules may send and receive data to and from the ad hoc networks 216, 218, 220 with the network interface cards 308, 310. Architecture 300 components 306, 308, 310, 312, 314 need not correspond one-to-one with, for example, open systems interconnect architecture layers. For example, the network interface cards may implement aspects of the data link layer as well as the physical layer.

In this example, the networking service 306 includes a transport control protocol and internet protocol (TCP/IP) stack 316. Alternative architectures in accordance with an embodiment of the invention may include one or more additional or alternative network protocol stacks not shown in FIG. 3. The networking service 306 may include an automatic private internet protocol addressing (APIPA) module 318 capable of generating and assigning a private internet protocol address for the computer 302 independent of remote network services such as internet protocol address generation and assignment services provided by a dynamic host configuration protocol (DHCP) server. Details of an automatic private internet protocol addressing implementation in accordance with an embodiment of the invention, in particular details of serverless operation, as well as network assigned internet protocol addressing, are described by the *Plug and Play Networking with Microsoft Automatic Private IP Addressing* article, dated March 1998, in the *Internet Protocol Helper* section of the *Microsoft® Windows® Platform Software Development Kit (SDK)* in the *Microsoft Developer Network (MSDN®) Library*. Similar automatic addressing mechanisms may be included for networking protocols other than the internet protocol (IP). Although not shown in FIG. 3, embodiments of the invention may include a conventional dynamic host configuration protocol (DHCP) module capable of providing for network assigned internet protocol addressing.

In an embodiment of the invention, the networking service 306 includes an ad hoc network convergence module 320 for facilitating efficient ad hoc network formation. The ad hoc network convergence module 320 may include an ad hoc network parameter generator 322, an ad hoc network convergence rule set 324 and an ad hoc network address acquisition mode module 326.

The ad hoc network parameter generator 322 may generate ad hoc network parameters suitable for pseudo-random distribution such as network identifiers and radio frequency channel selections (e.g., wireless communication channel numbers). The ad hoc network convergence rule set 324 may include one or more ad hoc network convergence rules utilized by the ad hoc network convergence module to facilitate ad hoc network convergence. In particular, the ad hoc network convergence rule set 324 may determine one or more ad hoc network parameters that are not suitable for pseudo-random distribution and/or for which an optimal choice from an available set of values is possible such as physical layer communication scheme (e.g., "PHY type") selection. The ad hoc network address acquisition mode module 326 may manage transitions of the networking service 306 to and from an ad hoc network address acquisition mode, for example, from and to an infrastructure and/or default network address acquisition mode.

The networking service 306 may further include a network name or service set identifier (SSID) 328. The service set identifier 328 need not include computer-executable instructions, for example, the service set identifier 328 may be a data field stored in system memory 106 (FIG. 1). The service set identifier 328 may be simultaneously associated with distinct ad hoc networks, for example, the ad hoc networks 218 and 220 (FIG. 2) may be associated with same service set identifier 328 values. In an embodiment of the invention, two or more ad hoc networks associated with same service set identifier 328 values have a goal of convergence to a single ad hoc network such as the ad hoc network 216. Of course, the networking service 306 may include multiple service set identifiers such as the service set identifier 328, although, for clarity, only one such is depicted in FIG. 3.

In an embodiment of the invention, the networking service 306 may further include an ad hoc network graphical user interface (GUI) 330 for configuring, commanding and/or otherwise interacting with the networking service 306. In one or more alternate embodiments of the invention, the ad hoc network graphical user interface 330 may be incorporated into a general network joining graphical user interface not specific to ad hoc networks, and need not be a part of the networking service 306. In particular, a user of the computer 302 may input a value for the service set identifier 328 with the ad hoc network graphical user interface 330. The service set identifier 328 value may be entered with an alphanumeric keyboard, selected from a list of options and/or input with any suitable graphical or non-graphical user interface device and/or control, or, for example, automatically determined based on one or more networks (not necessarily ad hoc networks 216, 218, 220 of FIG. 2) detected by one or more network interface cards 308, 310.

Each computer 202, 204, 206, 208, 210, 212 and 214 (FIG. 2) may include some or all of the elements depicted in FIG. 3. In particular, some or all of the computers 202, 204, 206, 208, 210, 212 and 214 may include the ad hoc network convergence module 320. In an embodiment of the invention, same or similar operation of the ad hoc network parameter generator 322, the ad hoc network convergence rule set 324 and/or the ad hoc network address acquisition module 326 at each computer 202, 204, 206, 208, 210, 212 and 214 enables efficient ad hoc network formation.

Figure 4:
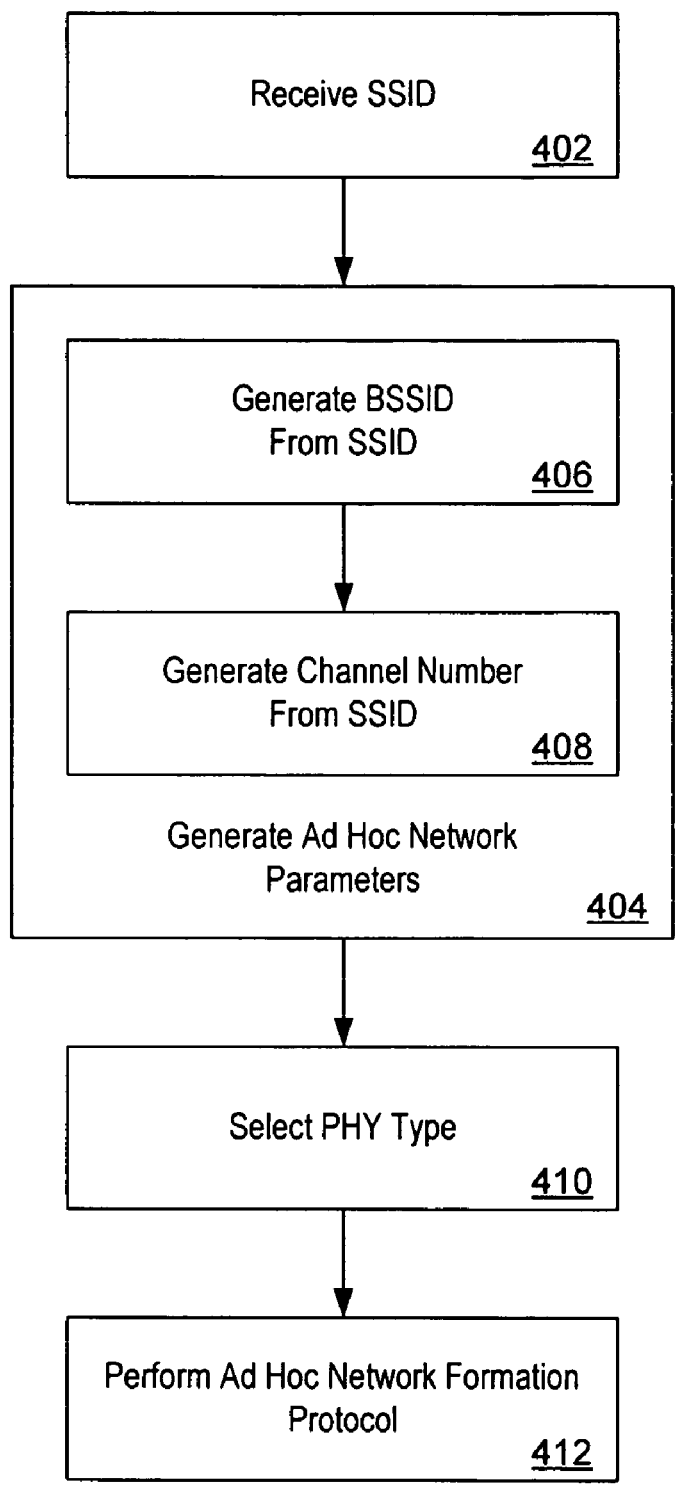
FIG. 4 is a flowchart depicting example steps for facilitating ad hoc network convergence in accordance with an embodiment of the invention.

Having described the example architecture 300, example methods for efficient ad hoc network formation are now described. In an embodiment of the invention, faster ad hoc network convergence is facilitated by generating same or similar ad hoc network parameter values from a single seed value and/or from a same set or subset of convergence rules. FIG. 4 depicts example steps for facilitating ad hoc network convergence in accordance with an embodiment of the invention.

At step 402, an ad hoc network identifier, such as the service set identifier (SSID) 328 (FIG. 3), may be received, for example, by the ad hoc network convergence module 320. The ad hoc network identifier is typically an alphanumeric or Unicode® character string, but may be any suitable ad hoc network name or identifier. For example, a group of people, each with a computer 202, 204, 206, 208, 210, 212 and 214 (FIG. 2) incorporating the networking service 306, may gather in a meeting room and decide to form an ad hoc network. It may be that the group decides to call the ad hoc network "meeting" and that one or more of the group members enter the network name (i.e., the service set identifier 328 value) "meeting" with the ad hoc network graphical user interface 330. A first to enter the network name "meeting" may be considered a founder of the ad hoc network. In this example, the service set identifier 328 value "meeting" is then received by the ad hoc network convergence module 320 from the ad hoc network graphical user interface 330, directly, or by way of the networking service 306. The service set identifier 328 value "meeting" may be automatically received by one or more of the group members and, for example, result in a graphical invitation to join the ad hoc network "meeting" which each invitee may accept, reject or ignore.

At step 404, one or more ad hoc network parameters may be generated as a function, for example a cryptographic one-way hashing function, of the service set identifier 328 (FIG. 3) value. The example depicted by FIG. 4 shows two ad hoc network parameters being generated at sub-steps 406 and 408 of step 404. Each of steps 404, 406 and 408 may perform any suitable cryptographic hash function. Such cryptographic hash functions are well-known in the art and need not be described here in detail. Steps 404, 406 and/or 408 may be performed by the ad hoc network parameter generator 322. Each computer 202, 204, 206, 208, 210, 212 and 214 (FIG. 2) may incorporate the ad hoc network parameter generator 322. The ad hoc network parameter generator 322 may generate the same one or more ad hoc network parameter values at each computer 202, 204, 206, 208, 210, 212 and 214 that is supplied with the same service set identifier 328.

At step 406, a basic service set identifier (BSSID) may be generated as a function, for example a cryptographic hash function, of the service set identifier 328 (FIG. 3) value. Despite their similar names, those of skill in the art will appreciate that the service set identifier (SSID) 328 and the basic service set identifier (BSSID) are distinct identifiers serving in different roles. For example, in contrast to the service set identifier 328 which may be chosen by the computer 302 user to identify the ad hoc network 216 (FIG. 2), a media access control (MAC) address associated with one of the network interface cards 308 or 310 may be utilized in conventional systems and methods as the basic service set identifier. In an embodiment of the invention, the ability for different basic service set identifiers to be associated with the same service set identifier can be a cause of ad hoc network convergence inefficiency, for example, resulting in multiple ad hoc networks 218 and 220 (FIG. 2) instead of the single ad hoc network 216, so that generating the basic service set identifier as a function of the service set identifier may prevent this inefficiency.

At step 408, a wireless communication channel number may be generated as a function, for example, a cryptographic hash function, of the service set identifier 328 (FIG. 3). Again, choice of different channel numbers by different computers 202, 204, 206, 208, 210, 212 and 214 (FIG. 2) during ad hoc network formation may cause ad hoc network convergence inefficiency. In an embodiment of the invention, generating a same wireless communication channel number as a function of the same service set identifier 328 value at each computer 202, 204, 206, 208, 210, 212 and 214 prevents this ad hoc network formation inefficiency.

At step 410, a physical layer communication scheme (e.g., "PHY type") may be selected from a set of available schemes. For example, each computer 202, 204, 206, 208, 210, 212 and 214 (FIG. 2) may include network interface cards 308, 310 supporting one or more of PHY types IEEE 802.11a, 802.11b and 802.11g. Step 410 may be performed at each computer 202, 204, 206, 208, 210, 212 and 214 during ad hoc network formation, and a PHY type may be selected, for example, in accordance with some subset of the ad hoc network convergence rule set 324 (FIG. 3). Example steps for selecting the physical layer communication scheme in accordance with an embodiment of the invention are described below in more detail with reference to FIG. 7.

Having established a common set of ad hoc network parameters at computers 202, 204, 206, 208, 210, 212 and 214 (FIG. 2), at step 412, an ad hoc network formation protocol may be performed, for example, by the computers 202, 204, 206, 208, 210, 212 and 214, utilizing (i.e., parameterized with) the common set of ad hoc network parameters. Step 412 may include explicit parameterization of the ad hoc network formation protocol, for example, the ad hoc network convergence module 320 (FIG. 3) may store generated, selected and/or determined ad hoc network parameter values with the networking service 306. In an embodiment of the invention, as compared to a conventional lack of co-ordination between computers 202, 204, 206, 208, 210, 212 and 214, establishment of the common set of ad hoc network parameters at steps 404, 406, 408 and/or 410 do result in a more efficient ad hoc network formation. Further details with respect to ad hoc network formation are described below with reference to FIGS. 5 and 6.

Figure 5:
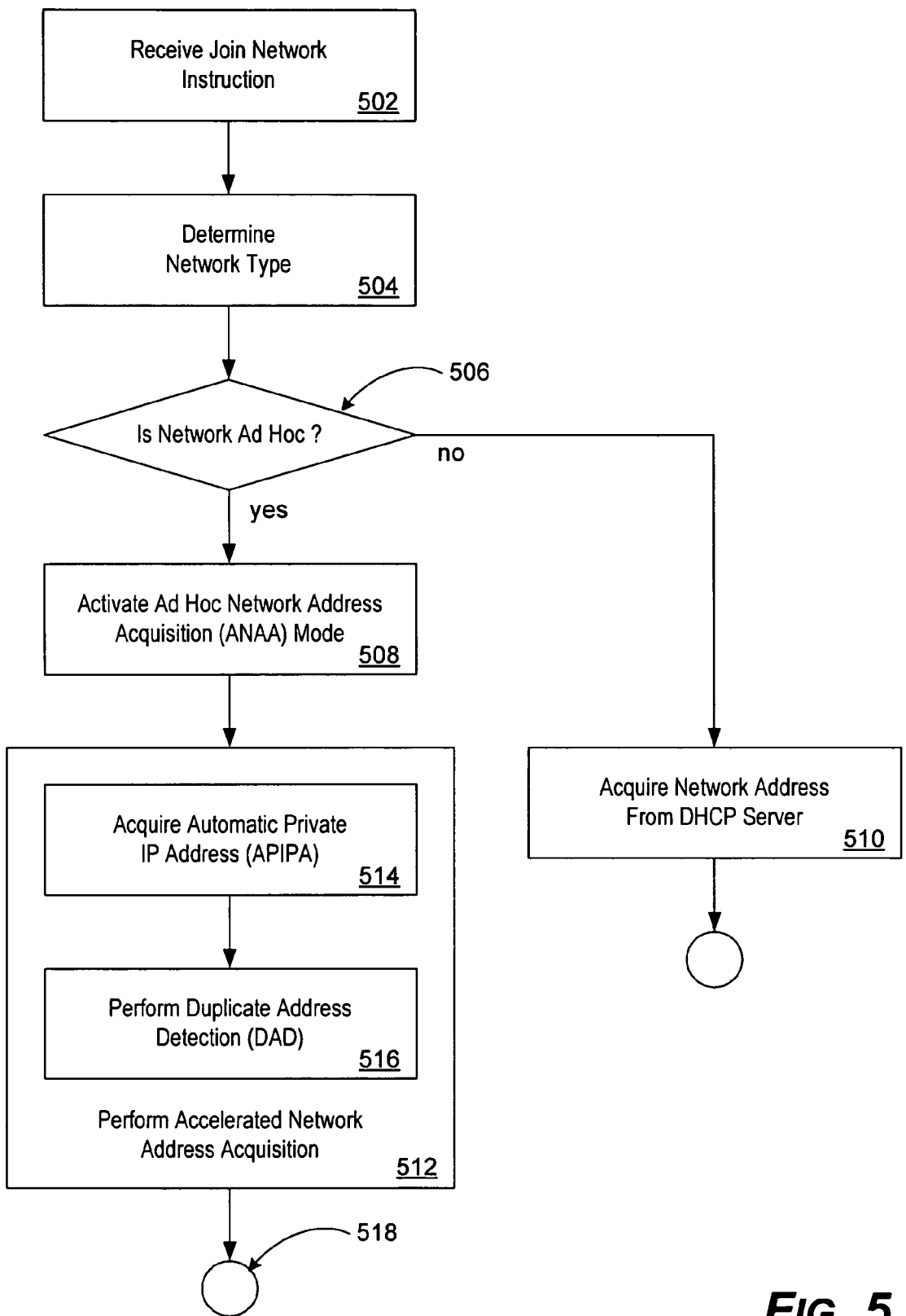
FIG. 5 is a flowchart depicting example steps for efficient ad hoc network formation in accordance with an embodiment of the invention.

FIG. 5 depicts example steps for ad hoc network formation in accordance with an embodiment of the invention. In particular, FIG. 5 depicts example steps for efficient network address acquisition in a computer networking environment independent of infrastructure network resources such as dynamic host configuration protocol (DHCP) servers. For example, the steps depicted in FIG. 5 may be performed as part of step 412 (FIG. 4).

At step 502, an instruction to join a computer network may be received. For example, the networking service 306 (FIG. 3) may receive the instruction to join the computer network from the computer operating system 304. At step 504, a type of the computer network to be joined may be determined. In particular, it may be determined whether the computer to be joined is an infrastructure computer network or an ad hoc computer network. The determination of step 504 may be made in accordance with a context of the instruction to join (the context may even explicitly specify the network type), or, for example, the ad hoc network convergence module 320 may query the networking service 306 and/or the computer operating system 304 for information corresponding to the network type. In an embodiment of the invention, steps 502 and 504 occur in concert with step 402 (FIG. 4) and prior to steps 404 and 410.

With the network type determined at step 504, the network type may be tested at step 506. If the network is an ad hoc network, the procedure may progress to step 508. Otherwise, the procedure may progress to step 510. At step 508, an ad hoc network address acquisition (ANAA) mode may be activated, for example, by the ad hoc network address acquisition mode module 326 (FIG. 3). In particular the ad hoc network address acquisition mode may avoid active reference of infrastructure network resources such as dynamic host configuration protocol (DHCP) servers. In contrast, at step 510, without ad hoc network address acquisition mode having been activated, an attempt may be made to acquire a network address from just such an infrastructure network resource. With ad hoc network address acquisition mode activated, the procedure may progress to step 512.

At step 512, accelerated acquisition of an ad hoc network address may occur independent of infrastructure network resources. FIG. 5 depicts two example sub-steps 514 and 516 of step 512 suitable for incorporation into step 512 when the ad hoc network address to acquire is an internet protocol (IP) address, however, as will be apparent to one of skill in the art, each embodiment of the invention is not so limited. At step 514, an automatic private IP address (APIPA) may be acquired, for example, with the automatic private IP address (APIPA) module 318 (FIG. 3). Since, in an embodiment of the invention, the automatic private IP address is assigned pseudo-randomly and without reference to a coordinating infrastructure network resource, there is a chance that more than one computer 202, 204, 206, 208, 210, 212 and 214 (FIG. 2) in a forming ad hoc network 216 may acquire a same automatic private IP address. At step 516, such duplicate addresses may be detected and reacquired in a conventional duplicate address detection procedure.

Significantly, the ad hoc network address acquisition mode activated at step 508 may be an accelerated and/or a more efficient mode of network address acquisition for ad hoc network as compared to, for example, a default or infrastructure network address acquisition mode. For example, the default or infrastructure network address acquisition mode may include one or more steps corresponding to step 510 at which an attempt may be made to acquire a network address from a dynamic host configuration protocol server or the like. If such an attempt is made on a network that lacks such infrastructure, some amount of time will be wasted (e.g., 60 seconds) before the attempt times out, even if, one or more steps corresponding to step 512 are then performed. The ad hoc network address acquisition mode may avoid potentially difficult problems associated with enhancing infrastructure element detection efficiencies, by avoiding such detection attempts. In an embodiment of the invention, the ad hoc network address acquisition mode thus enhances ad hoc network formation efficiency. In one or more embodiments of the invention, the ad hoc network address acquisition mode may proceed in parallel with one or more alternative network address acquisition modes such as the default or infrastructure network address acquisition modes, and, for example, one or more network addresses obtained with alternative network address acquisition modes may supplement or replace the network address acquired by the ad hoc network address acquisition mode.

Figure 6:
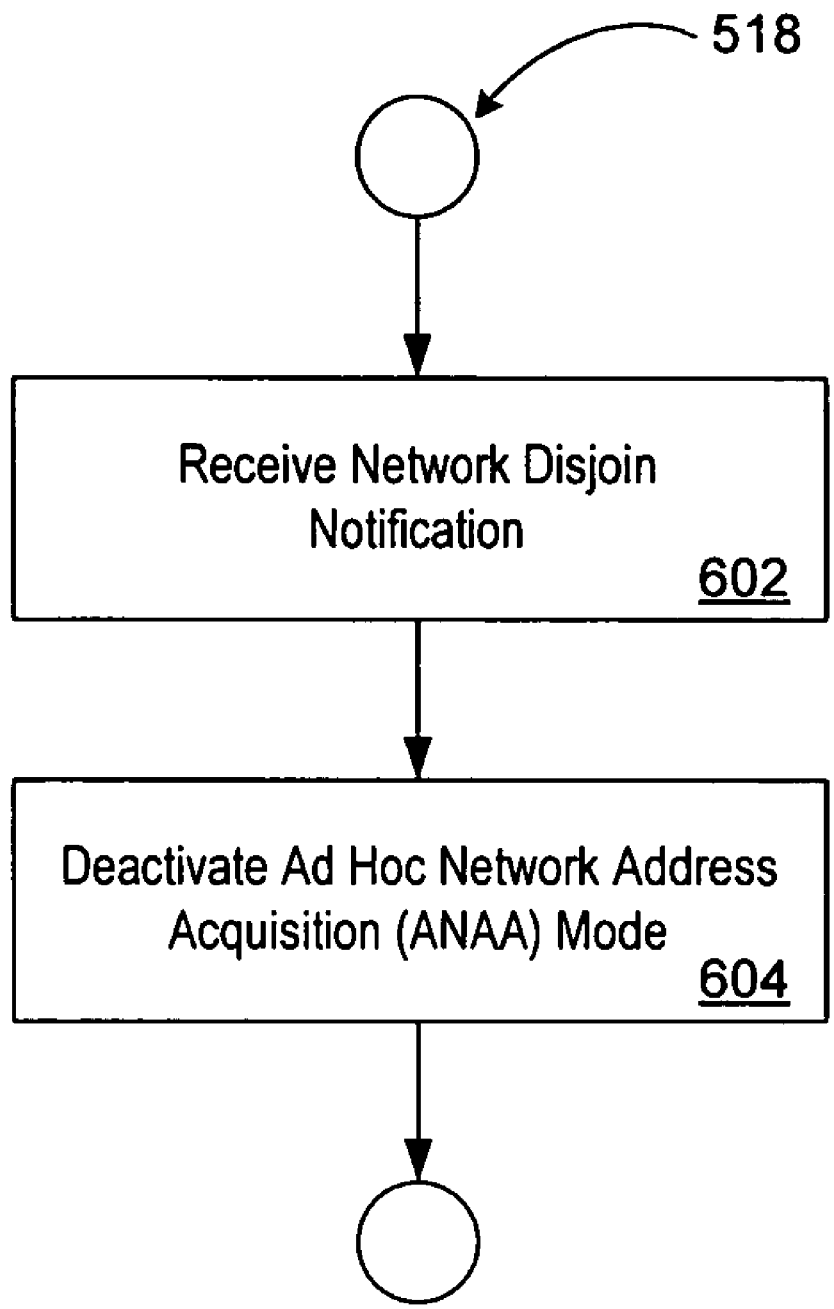
FIG. 6 is a flowchart depicting example steps for leaving an ad hoc network in accordance with an embodiment of the invention.

Once the ad hoc network address has been successfully acquired at step 512, the computer 202, 204, 206, 208, 210, 212 and 214 (FIG. 2) performing the step 512 may be considered to have joined an ad hoc network such as the ad hoc network 216, 218 or 220. At some point, the computer 202, 204, 206, 208, 210, 212 and 214 may leave the ad hoc network 216, 218 or 220. FIG. 6 depicts example steps for leaving the ad hoc network 216, 218 or 220 in accordance with an embodiment of the invention. A connecting symbol 518 indicates a continuity between the steps depicted by FIG. 5 and the steps depicted by FIG. 6.

At step 602, an ad hoc network disjoin notification may be received, for example, by the ad hoc network convergence module 320 (FIG. 3). In an embodiment of the invention, ad hoc network disjoin notifications correspond to conventional media disconnect notifications provided by the networking service 306. In response to the ad hoc network disjoin notification, at step 604, the ad hoc network address acquisition (ANAA) mode activated at step 508 (FIG. 5) may be deactivated. As a result, the networking service 306 may revert to a default or infrastructure mode of network address acquisition.

Figure 7:
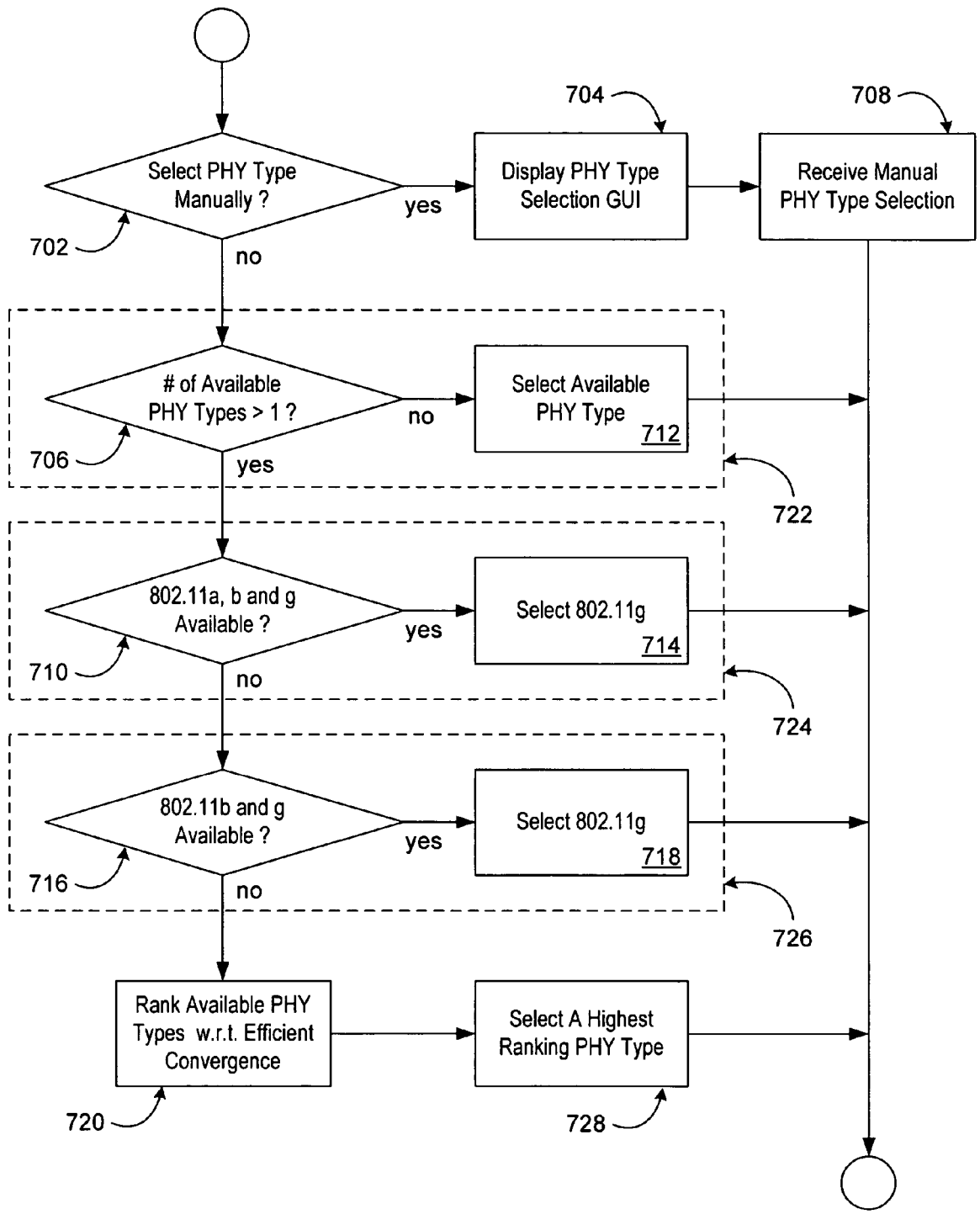
FIG. 7 is a flowchart depicting example steps for selecting a physical layer communication scheme in accordance with an embodiment of the invention.

FIG. 7 depicts example steps for selecting the physical layer communication scheme in accordance with an embodiment of the invention. At step 702, it may be determined if the physical layer communication scheme (e.g., "PHY type") is to be selected manually. For example, a configuration element of the networking service 306 (FIG. 3) may indicate whether then physical layer communication scheme is to be selected manually or automatically. If the physical layer communication scheme is to be selected manually, the procedure may progress to step 704. Otherwise the procedure may progress to step 706.

At step 704, a physical layer communication scheme selection graphical user interface (GUI) may be displayed to the computer 302 (FIG. 3) user, for example, by the networking service 306. The physical layer communication scheme selection graphical user interface may present physical layer communication scheme options for selection by the computer 302 user. For example, the physical layer communication scheme options may be determined by capabilities of the network interface cards 308, 310. At step 708, a selection made by the computer 302 user may be received, for example, by the networking service 306.

At step 706, a number of available physical layer communication schemes may be determined. For example, the ad hoc network convergence module 320 (FIG. 3) may query the networking service 306 with respect to the capabilities of the network interface cards 308, 310 of the computer 302. If the number of available physical layer communication schemes is determined to be more than one, then the procedure may progress to step 710. Otherwise, the procedure may progress to step 712. At step 712, the single available physical layer communication scheme may be selected, or, if there are no available physical layer communication schemes, a programmatic exception may be raised.

At step 710, it may be determined if the IEEE 802.11a, 802.11b and 802.11g physical layer communication schemes are available. If the IEEE 802.11a, 802.11b and 802.11g physical layer communication schemes are available, the procedure may progress to step 714. Otherwise, the procedure may progress to step 716. At step 714, the IEEE 802.11g physical layer communication scheme may be selected. In an embodiment of the invention, selecting the IEEE 802.11g physical layer communication scheme for this condition optimizes ad hoc network convergence because the IEEE 802.11g physical layer communication scheme has a backwards compatibility with the 802.11b physical layer communication scheme whereas neither 802.11b nor 802.11g are backward compatible 802.11a.

At step 716, it may be determined if the IEEE 802.11b and 802.11g physical layer communication schemes are available. If the IEEE 802.11b and 802.11g physical layer communication schemes are available, the procedure may progress to step 718. Otherwise, the procedure may progress to step 720. At step 718, the IEEE 802.11g physical layer communication scheme may be selected. In an embodiment of the invention, selecting the IEEE 802.11g physical layer communication scheme for this condition optimizes ad hoc network convergence because the IEEE 802.11g physical layer communication scheme has a backwards compatibility with the 802.11b physical layer communication scheme.

As indicated by the dashed lines 722, 724 and 726, each of the condition-action pairs, that is, steps 706 and 712, steps 710 and 714, and steps 716 and 718, may be considered to be an ad hoc network convergence rule suitable for encoding and/or incorporation in the ad hoc network convergence rule set 324 (FIG. 3). Each embodiment of the invention need not have each of the rules 722, 724 and 726. An embodiment of the invention may have less or more than the rules 722, 724 and 726. Additional and/or different rules may have an ad hoc network convergence condition and an ad hoc network convergence action similar to the rules 722, 724 or 726, but each embodiment of the invention is not so limited. The ad hoc network convergence condition may include any suitable predicate, for example, as defined by a database or programming language. The ad hoc network convergence action may include any suitable set of programmatic instructions, for example, as defined by a database or programming language and including function calls and other interactions with the operating system 304 (FIG. 3) of the computer 302 and with remote computer(s) 116 (FIG. 1).

Having exhausted the rule set 722, 724 and 726 in this example, the procedure may progress to step 720 to attempt a ranking-based physical layer communication scheme section procedure. Although, in an alternative embodiment of the invention, steps 720 and 728 are omitted and a programmatic exception is raised if the ad hoc network convergence rule set 324 is exhausted.

At step 720, each available physical layer communication scheme may be ranked according to its ad hoc network convergence efficiency. For example, each physical layer communication scheme may be associated with a configured convergence rank or convergence ranking function, and the available physical layer communication schemes may be ranked according to their respective configured convergence ranks and/or a result of their respective convergence ranking functions. Suitable parameters for convergence ranking functions include the set of available physical layer communication schemes, their configured convergence ranks and/or their convergence ranking functions. Convergence ranking functions may modify existing configured convergence ranks and/or return new convergence ranks outright.

At step 728, a highest ranking physical layer communication scheme may be selected. Where two or more physical layer communication schemes are equally ranked, the selection may be chosen deterministically from among the equally ranked physical layer communication schemes, for example, in reverse alphabetical order of scheme names. In an embodiment of the invention, the steps depicted in FIG. 7 ensure that a same or compatible selection of physical layer communication scheme is made across the group of computers 202, 204, 206, 208, 210, 212 and 214 (FIG. 2) attempting to converge into the single ad hoc network 216, thus enhancing ad hoc network convergence efficiency.

In the example depicted by FIG. 7, steps 720 and 728 are shown as steps that may be performed in addition to, or instead of, those steps associated with rules 722, 724 and 726. However, in an alternative embodiment of the invention, steps 720 and 728 may be implemented as one or more ad hoc network convergence rules in the convergence rule set 324 (FIG. 3). Where steps are implemented as rules in the convergence rule set 324, the rules in the convergence rule set 324 may be interpreted by the ad hoc network convergence module 320. Otherwise, steps may be conventionally incorporated into, for example, the ad hoc network convergence module 320.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. At least one tangible computer storage medium having thereon computer-executable instructions that, when executed by a computing device, cause the computing device to carry out a method of efficient joining of an existing ad hoc network, the existing ad hoc network comprising at least one device adapted to communicate in the existing ad hoc network, the method comprising:
receiving an ad hoc network identifier for the existing ad hoc network, the ad hoc network identifier being a service set identifier for the existing ad hoc network, while the computing device is not communicatively connected to the existing ad hoc network, the existing ad hoc network being parameterized with at least one ad hoc network parameters;
generating, with the computing device, the at least one ad hoc network parameter as an output of a calculation taking as input the ad hoc network identifier; and
performing an ad hoc network formation protocol, including communicating messages according to the at least one ad hoc network parameter generated as the output of the calculation, to join the existing ad hoc network.

2. The at least one tangible computer storage medium of claim 1, wherein the ad hoc network is a wireless network in accordance with at least one of a family of Institute of Electrical and Electronics Engineers (IEEE) 802.11 data communication standards.

3. The at least one tangible computer storage medium of claim 1, wherein generating said at least one ad hoc network parameter comprises generating said at least one ad hoc network parameter as an output of a cryptographic hash function of, at least, the ad hoc network identifier.

4. The at least one tangible computer storage medium of claim 1, wherein said at least one ad hoc network parameter comprises a basic service set identifier.

5. The at least one tangible computer storage medium of claim 1, wherein said at least one ad hoc network parameter comprises a wireless communication channel number.

6. The at least one tangible computer storage medium of claim 1, wherein the method further comprises selecting a physical layer communication scheme from a set of available physical layer communication schemes in accordance with a set of ad hoc network convergence rules.

7. The at least one tangible computer storage medium of claim 6, wherein the set of ad hoc network convergence rules comprise:
(a) if the set of available physical layer communication schemes includes only one physical layer communication scheme then selecting that physical layer communication scheme; and
(b) if the set of available physical layer communication schemes includes physical layer communication schemes in accordance with IEEE 802.11b and IEEE 802.11g then selecting the physical layer communication scheme in accordance with IEEE 802.11g.

8. The at least one tangible computer storage medium of claim 6, wherein the set of ad hoc network convergence rules comprise:
(a) if the set of available physical layer communication schemes includes only one physical layer communication scheme then selecting that physical layer communication scheme; and
(b) if the set of available physical layer communication schemes includes physical layer communication schemes in accordance with IEEE 802.11a and IEEE 802.11g then selecting the physical layer communication scheme in accordance with IEEE 802.11g.

9. The at least one tangible computer storage medium of claim 6, wherein selecting the physical layer communication scheme comprises:
ranking each physical layer communication scheme in the set of available physical layer communication schemes according to its ad hoc network convergence efficiency; and
selecting a highest ranking physical layer communication scheme in the set of available physical layer communication schemes.

10. A computerized system for efficient joining of an existing ad hoc network, the existing ad hoc network comprising at least one device adapted to communicate in the existing ad hoc network, the computerized system comprising:
an ad hoc network convergence module configured to, at least:
receive at a first device an ad hoc network identifier for the existing ad hoc network while the first device is not communicatively connected to the existing ad hoc network, the ad hoc network identifier being a service set identifier for the existing ad hoc network, the existing ad hoc network being parameterized with a set of ad hoc network parameters;
generate the set of ad hoc network parameters on the first device as an output of a calculation taking as input the ad hoc network identifier for the existing ad hoc network, the set of ad hoc network parameters comprising a basic service set identifier (BSSID) and a wireless communication channel frequency; and
parameterize an ad hoc network formation protocol on the first device with said set of ad hoc network parameters; and
a networking service configured to, at least, join the existing ad hoc network by communicating at least one message according to said set of ad hoc network parameters.

11. The computerized system of claim 10, wherein the ad hoc network is a wireless network in accordance with at least one of a family of Institute of Electrical and Electronics Engineers (IEEE) 802.11 data communication standards.

12. The computerized system of claim 10, wherein generating said set of ad hoc network parameters comprises generating at least one parameter of the set of ad hoc network parameters as an output of a cryptographic hash function of, at least, the ad hoc network identifier.

13. The computerized system of claim 10, wherein receiving the ad hoc network identifier comprises receiving the ad hoc network identifier wirelessly from an external source.

14. A system of computing devices each acting as a node of an ad hoc network, the system comprising:
a first computing device adapted to:
receive an identifier for the ad hoc network from a user of the first computing device when the first computing device is not communicatively connected to the ad hoc network,
perform a calculation to generate at least one ad hoc network parameter, the calculation taking as input the identifier for the ad hoc network and producing as output the at least one ad hoc network parameter; and a second computing device adapted to:
receive the identifier for the ad hoc network from a user of the second computing device when the second computing device is not communicatively connected to the ad hoc network,
perform the calculation to generate at least one ad hoc network parameter, the calculation taking as input the identifier for the ad hoc network and producing as output the at least one ad hoc network parameter, and
communicate with the first computing device in the ad hoc network using the at least one ad hoc network parameter.

15. The system of claim 14, wherein the identifier for the ad hoc network is a service set identifier (SSID).

16. The system of claim 14, wherein each computing device connected to the ad hoc network is adapted to perform the calculation to generate at least one ad hoc network parameter based on the ad hoc network identifier.

17. The system of claim 14, wherein when a new computing device attempts to join the ad hoc network, the new computing device generates the at least one ad hoc network parameter generated on the first and second computing devices.

18. The system of claim 14, further comprising a founder computing device to found the ad hoc network with which the first computing device and second computing device associate,
wherein the founder computing device determines the identifier based on a first value input by a user.

* * * * *